（12） United States Patent
Marshall et al.

(10) Patent No.: US 10,162,753 B2
(45) Date of Patent: *Dec. 25, 2018

(54) MANAGING RESOURCES USING RESOURCE EXPIRATION DATA

(71) Applicant: Amazon Technologies, Inc., Seattle, WA (US)

(72) Inventors: Bradley Eugene Marshall, Bainbridge Island, WA (US); Swaminathan Sivasubramanian, Seattle, WA (US); David R. Richardson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/871,872

(22) Filed: Sep. 30, 2015

(65) Prior Publication Data
US 2016/0026568 A1 Jan. 28, 2016

Related U.S. Application Data

(63) Continuation of application No. 14/331,067, filed on Jul. 14, 2014, now Pat. No. 9,176,894, which is a
(Continued)

(51) Int. Cl.
*G06F 12/0808* (2016.01)
*H04L 29/08* (2006.01)
(Continued)

(52) U.S. Cl.
CPC ...... *G06F 12/0808* (2013.01); *G06F 12/0811* (2013.01); *G06F 12/12* (2013.01);
(Continued)

(58) Field of Classification Search
CPC .................. H04L 67/2885; H04L 67/2852
(Continued)

(56) References Cited

U.S. PATENT DOCUMENTS 5,905,248 A 5/1999 Russell et al.
5,974,454 A 10/1999 Apfel et al.
(Continued)

FOREIGN PATENT DOCUMENTS

CA 2741 895 A1 5/2010
CN 1511399 A 7/2004
(Continued)

OTHER PUBLICATIONS

Kenshi, P., "Help File Library: Iptables Basics," Justlinux, retrieved Dec. 1, 2005, from http://www.justlinux.com/nhf/Security/Iptables _ Basics.html, 4 pages.
(Continued)

*Primary Examiner* — El Hadji M Sall
(74) *Attorney, Agent, or Firm* — Knobbe Martens Olson & Bear LLP

(57) ABSTRACT

Resource management techniques, such as cache optimization, are employed to organize resources within caches such that the most requested content (e.g., the most popular content) is more readily available. A service provider utilizes content expiration data as indicative of resource popularity. As resources are requested, the resources propagate through a cache server hierarchy associated with the service provider. More frequently requested resources are maintained at edge cache servers based on shorter expiration data that is reset with each repeated request. Less frequently requested resources are maintained at higher levels of a cache server hierarchy based on longer expiration data associated with cache servers higher on the hierarchy.

24 Claims, 9 Drawing Sheets

Related U.S. Application Data continuation of application No. 12/485,783, filed on Jun. 16, 2009, now Pat. No. 8,782,236.

(51) Int. Cl.
*G06F 12/0811* (2016.01)
*G06F 12/12* (2016.01)

(52) U.S. Cl.
CPC ...... *H04L 67/2852* (2013.01); *H04L 67/2885* (2013.01); *G06F 2212/163* (2013.01); *G06F 2212/464* (2013.01)

(58) Field of Classification Search
USPC .............. 709/203, 226, 200, 219; 711/122
See application file for complete search history.

(56) References Cited

U.S. PATENT DOCUMENTS

| | | | |
|---|---|---|---|
| 5,991,306 A | 11/1999 | Burns et al. | |
| 5,999,274 A | 12/1999 | Lee et al. | |
| 6,018,619 A | 1/2000 | Allard et al. | |
| 6,151,631 A | 11/2000 | Ansell et al. | |
| 6,173,316 B1 | 1/2001 | De Boor et al. | |
| 6,345,308 B1 | 2/2002 | Abe | |
| 6,484,161 B1 | 11/2002 | Chipalkatti et al. | |
| 6,493,765 B1 | 12/2002 | Cunningham et al. | |
| 6,523,036 B1 | 2/2003 | Hickman et al. | |
| 6,654,807 B2 | 11/2003 | Farber et al. | |
| 6,718,324 B2 | 4/2004 | Edlund et al. | |
| 6,868,439 B2 | 3/2005 | Basu et al. | |
| 6,925,499 B1 | 8/2005 | Chen et al. | |
| 6,963,850 B1 | 11/2005 | Bezos et al. | |
| 7,058,633 B1 | 6/2006 | Gnagy et al. | |
| 7,117,262 B2 | 10/2006 | Bai et al. | |
| 7,139,808 B2 | 11/2006 | Anderson et al. | |
| 7,194,552 B1 | 3/2007 | Schneider | |
| 7,240,100 B1 | 7/2007 | Wein et al. | |
| 7,269,784 B1 | 9/2007 | Kasriel et al. | |
| 7,272,227 B1 | 9/2007 | Beran | |
| 7,284,056 B2 | 10/2007 | Ramig | |
| 7,318,074 B2 | 1/2008 | Iyengar et al. | |
| 7,337,968 B2 | 3/2008 | Wilz, Sr. et al. | |
| 7,340,505 B2 | 3/2008 | Lisiecki et al. | |
| 7,372,809 B2 | 5/2008 | Chen | |
| 7,389,354 B1 | 6/2008 | Sitaraman et al. | |
| 7,409,712 B1 | 8/2008 | Brooks et al. | |
| 7,492,720 B2 | 2/2009 | Pruthi et al. | |
| 7,506,034 B2 | 3/2009 | Coates et al. | |
| 7,593,935 B2 | 9/2009 | Sullivan | |
| 7,657,613 B1 | 2/2010 | Hanson et al. | |
| 7,684,394 B1 | 3/2010 | Cutbill et al. | |
| 7,685,109 B1 | 3/2010 | Ransil et al. | |
| 7,693,959 B2 | 4/2010 | Leighton et al. | |
| 7,783,727 B1 | 8/2010 | Foley et al. | |
| 7,792,989 B2 | 9/2010 | Toebes et al. | |
| 7,853,719 B1 | 12/2010 | Cao et al. | |
| 7,865,594 B1 | 1/2011 | Baumback et al. | |
| 7,865,953 B1 | 1/2011 | Hsieh et al. | |
| 7,933,988 B2 | 4/2011 | Nasuto et al. | |
| 7,996,533 B2 | 8/2011 | Leighton et al. | |
| 8,001,187 B2 | 8/2011 | Stochosky | |
| 8,042,054 B2 | 10/2011 | White et al. | |
| 8,132,242 B1 | 3/2012 | Wu | |
| 8,156,199 B1 | 4/2012 | Hoche-Mong et al. | |
| 8,209,695 B1 | 6/2012 | Pruyne et al. | |
| 8,250,135 B2 | 8/2012 | Driesen et al. | |
| 8,266,327 B2 | 9/2012 | Kumar et al. | |
| 8,271,471 B1 | 9/2012 | Kamvar et al. | |
| 8,281,035 B2 | 10/2012 | Farber et al. | |
| 8,296,393 B2 | 10/2012 | Alexander et al. | |
| 8,301,600 B1 | 10/2012 | Helmick et al. | |
| 8,380,831 B2 | 2/2013 | Barber | |
| 8,380,851 B2 | 2/2013 | McCarthy et al. | |
| 8,423,408 B1 | 4/2013 | Barnes et al. | |
| 8,423,662 B1 | 4/2013 | Weihl et al. | |
| 8,447,831 B1 | 5/2013 | Sivasubramanian et al. | |
| 8,452,745 B2 | 5/2013 | Ramakrishna | |
| 8,521,876 B2 | 8/2013 | Goodman et al. | |
| 8,521,880 B1 | 8/2013 | Richardson et al. | |
| 8,527,639 B1 | 9/2013 | Liskov et al. | |
| 8,549,646 B2 | 10/2013 | Stavrou et al. | |
| 8,612,565 B2 | 12/2013 | Schneider | |
| 8,615,549 B2 | 12/2013 | Knowles et al. | |
| 8,619,780 B1 | 12/2013 | Brandwine | |
| 8,683,023 B1 | 3/2014 | Brandwine et al. | |
| 8,712,950 B2 | 4/2014 | Smith et al. | |
| 8,745,177 B1 | 6/2014 | Kazerani et al. | |
| 8,812,727 B1 | 8/2014 | Sorenson, III et al. | |
| 8,904,009 B1 | 12/2014 | Marshall et al. | |
| 8,935,744 B2 | 1/2015 | Osterweil et al. | |
| 8,949,459 B1 | 2/2015 | Scholl | |
| 8,972,580 B2 | 3/2015 | Fleischman et al. | |
| 9,003,040 B2 | 4/2015 | MacCarthaigh et al. | |
| 9,037,975 B1 | 5/2015 | Taylor et al. | |
| 9,075,777 B1 | 7/2015 | Pope et al. | |
| 9,075,893 B1 | 7/2015 | Jenkins | |
| 9,116,803 B1 | 8/2015 | Agrawal et al. | |
| 9,130,977 B2 | 9/2015 | Zisapel et al. | |
| 9,137,302 B2 | 9/2015 | Makhijani et al. | |
| 9,154,551 B1 | 10/2015 | Watson | |
| 9,160,703 B2 | 10/2015 | Richardson et al. | |
| 9,172,674 B1 | 10/2015 | Patel et al. | |
| 9,176,894 B2 | 11/2015 | Marshall et al. | |
| 9,185,012 B2 | 11/2015 | Richardson et al. | |
| 9,191,338 B2 | 11/2015 | Richardson et al. | |
| 9,191,458 B2 | 11/2015 | Richardson et al. | |
| 9,195,996 B1 | 11/2015 | Walsh et al. | |
| 9,237,087 B1 | 1/2016 | Risbood et al. | |
| 9,323,577 B2 | 4/2016 | Marr et al. | |
| 9,332,078 B2 | 5/2016 | Sivasubramanian et al. | |
| 9,386,038 B2 | 7/2016 | Martini | |
| 9,391,949 B1 | 7/2016 | Richardson et al. | |
| 9,407,676 B2 | 8/2016 | Archer et al. | |
| 9,407,681 B1 | 8/2016 | Richardson et al. | |
| 9,407,699 B2 | 8/2016 | Sivasubramanian et al. | |
| 9,444,718 B2 | 9/2016 | Khakpour et al. | |
| 9,444,759 B2 | 9/2016 | Richardson et al. | |
| 9,479,476 B2 | 10/2016 | Richardson et al. | |
| 9,495,338 B1 | 11/2016 | Hollis et al. | |
| 9,497,259 B1 | 11/2016 | Richardson et al. | |
| 9,515,949 B2 | 12/2016 | Richardson et al. | |
| 9,525,659 B1 | 12/2016 | Sonkin et al. | |
| 9,544,394 B2 | 1/2017 | Richardson et al. | |
| 9,571,389 B2 | 2/2017 | Richardson et al. | |
| 9,584,328 B1 | 2/2017 | Graham-Cumming | |
| 9,590,946 B2 | 3/2017 | Richardson et al. | |
| 9,608,957 B2 | 3/2017 | Sivasubramanian et al. | |
| 9,621,660 B2 | 4/2017 | Sivasubramanian et al. | |
| 9,628,509 B2 | 4/2017 | Holloway et al. | |
| 9,628,554 B2 | 4/2017 | Marshall et al. | |
| 9,705,922 B2 | 7/2017 | Foxhoven et al. | |
| 9,712,325 B2 | 7/2017 | Richardson et al. | |
| 9,712,484 B1 | 7/2017 | Richardson et al. | |
| 9,734,472 B2 | 8/2017 | Richardson et al. | |
| 9,742,795 B1 | 8/2017 | Radlein et al. | |
| 9,774,619 B1 | 9/2017 | Radlein et al. | |
| 9,787,599 B2 | 10/2017 | Richardson et al. | |
| 9,787,775 B1 | 10/2017 | Richardson et al. | |
| 9,794,216 B2 | 10/2017 | Richardson et al. | |
| 9,794,281 B1 | 10/2017 | Radlein et al. | |
| 9,800,539 B2 | 10/2017 | Richardson et al. | |
| 9,819,567 B1 | 11/2017 | Uppal et al. | |
| 9,832,141 B1 | 11/2017 | Raftery | |
| 9,887,915 B2 | 2/2018 | Richardson et al. | |
| 9,887,931 B1 | 2/2018 | Uppal et al. | |
| 9,887,932 B2 | 2/2018 | Uppal et al. | |
| 9,888,089 B2 | 2/2018 | Sivasubramanian et al. | |
| 9,893,957 B2 | 2/2018 | Ellsworth et al. | |
| 9,894,168 B2 | 2/2018 | Sivasubramanian et al. | |
| 9,912,740 B2 | 3/2018 | Richardson et al. | |
| 9,929,959 B2 | 3/2018 | Mostert | |
| 9,930,131 B2 | 3/2018 | MacCarthaigh et al. | |
| 2001/0000811 A1 | 5/2001 | May et al. | |

(56) References Cited

U.S. PATENT DOCUMENTS

| | | |
|---|---|---|
| 2001/0025305 A1 | 9/2001 | Yoshiasa et al. |
| 2001/0027479 A1 | 10/2001 | Delaney et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004846 A1 | 1/2002 | Garcia-Luna-Aceves et al. |
| 2002/0007413 A1 | 1/2002 | Garcia-Luna-Aceves et al. |
| 2002/0010783 A1 | 1/2002 | Primak et al. |
| 2002/0010798 A1 | 1/2002 | Ben-Shaul et al. |
| 2002/0035624 A1 | 3/2002 | Jun-hyeong |
| 2002/0048269 A1 | 4/2002 | Hong et al. |
| 2002/0049608 A1 | 4/2002 | Hartsell et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0065910 A1 | 5/2002 | Dutta |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0083178 A1 | 6/2002 | Brothers |
| 2002/0083198 A1 | 6/2002 | Kim et al. |
| 2002/0087374 A1 | 7/2002 | Boubez et al. |
| 2002/0091786 A1 | 7/2002 | Yamaguchi et al. |
| 2002/0091801 A1 | 7/2002 | Lewin et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0103820 A1 | 8/2002 | Cartmell et al. |
| 2002/0107944 A1 | 8/2002 | Bai et al. |
| 2002/0112049 A1 | 8/2002 | Elnozahy et al. |
| 2002/0116481 A1 | 8/2002 | Lee |
| 2002/0116491 A1 | 8/2002 | Boyd et al. |
| 2002/0116582 A1 | 8/2002 | Copeland et al. |
| 2002/0120666 A1 | 8/2002 | Landsman et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0131428 A1 | 9/2002 | Pecus et al. |
| 2002/0133741 A1 | 9/2002 | Maeda et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0138443 A1 | 9/2002 | Schran et al. |
| 2002/0143675 A1 | 10/2002 | Orshan |
| 2002/0143989 A1 | 10/2002 | Huitema et al. |
| 2002/0145993 A1 | 10/2002 | Chowdhury et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0150276 A1 | 10/2002 | Chang |
| 2002/0152326 A1 | 10/2002 | Orshan |
| 2002/0154157 A1 | 10/2002 | Sherr et al. |
| 2002/0156884 A1 | 10/2002 | Bertram et al. |
| 2002/0156911 A1 | 10/2002 | Croman et al. |
| 2002/0161745 A1 | 10/2002 | Call |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |
| 2002/0184368 A1 | 12/2002 | Wang |
| 2002/0188722 A1 | 12/2002 | Banerjee et al. |
| 2002/0194324 A1 | 12/2002 | Guha |
| 2002/0194382 A1 | 12/2002 | Kausik et al. |
| 2002/0198953 A1 | 12/2002 | O'Rourke et al. |
| 2003/0002484 A1 | 1/2003 | Freedman |
| 2003/0005111 A1 | 1/2003 | Allan |
| 2003/0007482 A1 | 1/2003 | Khello et al. |
| 2003/0009488 A1 | 1/2003 | Hart, III |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037108 A1 | 2/2003 | Peiffer et al. |
| 2003/0037139 A1 | 2/2003 | Shteyn |
| 2003/0041094 A1 | 2/2003 | Lara et al. |
| 2003/0046343 A1 | 3/2003 | Krishnamurthy et al. |
| 2003/0065739 A1 | 4/2003 | Shnier |
| 2003/0070096 A1 | 4/2003 | Pazi et al. |
| 2003/0074401 A1 | 4/2003 | Connell et al. |
| 2003/0074471 A1 | 4/2003 | Anderson et al. |
| 2003/0074472 A1 | 4/2003 | Lucco et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0112792 A1 | 6/2003 | Cranor et al. |
| 2003/0120741 A1 | 6/2003 | Wu et al. |
| 2003/0126387 A1 | 7/2003 | Watanabe |
| 2003/0133554 A1 | 7/2003 | Nykanen et al. |
| 2003/0135467 A1 | 7/2003 | Okamoto |
| 2003/0135509 A1 | 7/2003 | Davis et al. |
| 2003/0140087 A1 | 7/2003 | Lincoln et al. |
| 2003/0145038 A1 | 7/2003 | Tariq et al. |
| 2003/0145066 A1 | 7/2003 | Okada et al. |
| 2003/0149581 A1 | 8/2003 | Chaudhri et al. |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0177321 A1 | 9/2003 | Watanabe |
| 2003/0182305 A1 | 9/2003 | Balva et al. |
| 2003/0206520 A1 | 11/2003 | Wu et al. |
| 2003/0236779 A1 | 12/2003 | Choi et al. |
| 2004/0010562 A1 | 1/2004 | Itonaga |
| 2004/0010601 A1 | 1/2004 | Afergan |
| 2004/0054757 A1 | 3/2004 | Ueda et al. |
| 2004/0068542 A1 | 4/2004 | Lalonde et al. |
| 2004/0073707 A1 | 4/2004 | Dillon |
| 2004/0148520 A1 | 7/2004 | Talpade et al. |
| 2004/0184456 A1 | 9/2004 | Binding et al. |
| 2004/0246948 A1 | 12/2004 | Lee et al. |
| 2004/0250119 A1 | 12/2004 | Shelest et al. |
| 2005/0021862 A1 | 1/2005 | Schroeder et al. |
| 2005/0108262 A1 | 5/2005 | Fawcett |
| 2005/0149529 A1 | 7/2005 | Gutmans |
| 2005/0172080 A1 | 8/2005 | Miyauchi |
| 2005/0181769 A1 | 8/2005 | Kogawa |
| 2005/0198170 A1 | 9/2005 | LeMay et al. |
| 2005/0198303 A1 | 9/2005 | Knauerhase et al. |
| 2005/0198453 A1 | 9/2005 | Osaki |
| 2005/0216483 A1 | 9/2005 | Armstrong et al. |
| 2005/0223095 A1 | 10/2005 | Volz et al. |
| 2005/0228856 A1 | 10/2005 | Swildens et al. |
| 2005/0234864 A1 | 10/2005 | Shapiro |
| 2005/0240574 A1 | 10/2005 | Challenger et al. |
| 2005/0256880 A1 | 11/2005 | Nam Koong et al. |
| 2005/0259645 A1 | 11/2005 | Chen et al. |
| 2005/0266835 A1 | 12/2005 | Agrawal et al. |
| 2005/0267937 A1 | 12/2005 | Daniels et al. |
| 2005/0278259 A1 | 12/2005 | Gunaseelan et al. |
| 2006/0021001 A1 | 1/2006 | Giles et al. |
| 2006/0031239 A1 | 2/2006 | Koenig |
| 2006/0031319 A1 | 2/2006 | Nelson et al. |
| 2006/0031503 A1 | 2/2006 | Gilbert |
| 2006/0034494 A1 | 2/2006 | Holloran |
| 2006/0045005 A1 | 3/2006 | Blackmore et al. |
| 2006/0070060 A1 | 3/2006 | Tantawi et al. |
| 2006/0107036 A1 | 5/2006 | Randle et al. |
| 2006/0112176 A1 | 5/2006 | Liu et al. |
| 2006/0146820 A1 | 7/2006 | Friedman et al. |
| 2006/0165051 A1 | 7/2006 | Banerjee et al. |

(56) References Cited

U.S. PATENT DOCUMENTS

| | | |
|---|---|---|
| 2006/0173957 A1 | 8/2006 | Robinson |
| 2006/0224752 A1 | 10/2006 | Parekh et al. |
| 2006/0230265 A1 | 10/2006 | Krishna |
| 2006/0265508 A1 | 11/2006 | Angel et al. |
| 2007/0064610 A1 | 3/2007 | Khandani |
| 2007/0101061 A1 | 5/2007 | Baskaran et al. |
| 2007/0156726 A1 | 7/2007 | Levy |
| 2007/0156919 A1 | 7/2007 | Potti et al. |
| 2007/0168336 A1 | 7/2007 | Ransil et al. |
| 2007/0243860 A1 | 10/2007 | Aiello et al. |
| 2007/0245022 A1 | 10/2007 | Olliphant et al. |
| 2007/0250468 A1 | 10/2007 | Pieper |
| 2007/0271375 A1 | 11/2007 | Hwang |
| 2007/0271608 A1 | 11/2007 | Shimizu et al. |
| 2008/0016233 A1 | 1/2008 | Schneider |
| 2008/0056207 A1 | 3/2008 | Eriksson et al. |
| 2008/0086434 A1 | 4/2008 | Chesla |
| 2008/0086559 A1 | 4/2008 | Davis et al. |
| 2008/0101358 A1 | 5/2008 | Van Ewijk et al. |
| 2008/0109679 A1 | 5/2008 | Wright et al. |
| 2008/0147866 A1 | 6/2008 | Stolorz et al. |
| 2008/0256087 A1 | 10/2008 | Piironen et al. |
| 2008/0263135 A1 | 10/2008 | Olliphant |
| 2008/0288722 A1 | 11/2008 | Lecoq et al. |
| 2008/0312766 A1 | 12/2008 | Couckuyt |
| 2009/0043900 A1 | 2/2009 | Barber |
| 2009/0083279 A1 | 3/2009 | Hasek |
| 2009/0086728 A1 | 4/2009 | Gulati et al. |
| 2009/0094252 A1 | 4/2009 | Wong et al. |
| 2009/0106202 A1 | 4/2009 | Mizrahi |
| 2009/0132640 A1 | 5/2009 | Verma et al. |
| 2009/0138533 A1 | 5/2009 | Iwasaki et al. |
| 2009/0144411 A1 | 6/2009 | Winkler et al. |
| 2009/0157504 A1 | 6/2009 | Braemer et al. |
| 2009/0158163 A1 | 6/2009 | Stephens et al. |
| 2009/0164614 A1 | 6/2009 | Christian et al. |
| 2009/0198817 A1 | 8/2009 | Sundaram et al. |
| 2009/0248697 A1 | 10/2009 | Richardson et al. |
| 2009/0253435 A1 | 10/2009 | Olofsson |
| 2009/0259588 A1 | 10/2009 | Lindsay |
| 2009/0262741 A1 | 10/2009 | Jungck et al. |
| 2009/0276771 A1 | 11/2009 | Nickolov et al. |
| 2009/0327914 A1 | 12/2009 | Adar et al. |
| 2010/0020699 A1 | 1/2010 | On |
| 2010/0023621 A1 | 1/2010 | Ezolt et al. |
| 2010/0049862 A1 | 2/2010 | Dixon |
| 2010/0082320 A1 | 4/2010 | Wood et al. |
| 2010/0103837 A1 | 4/2010 | Jungck et al. |
| 2010/0125626 A1 | 5/2010 | Lucas et al. |
| 2010/0169392 A1 | 7/2010 | Lev Ran et al. |
| 2010/0174811 A1 | 7/2010 | Musiri et al. |
| 2010/0217856 A1 | 8/2010 | Falkena |
| 2010/0268814 A1 | 10/2010 | Cross et al. |
| 2010/0325365 A1 | 12/2010 | Colglazier et al. |
| 2011/0010244 A1 | 1/2011 | Hatridge |
| 2011/0051738 A1 | 3/2011 | Xu |
| 2011/0055386 A1 | 3/2011 | Middleton et al. |
| 2011/0055921 A1 | 3/2011 | Narayanaswamy et al. |
| 2011/0072366 A1 | 3/2011 | Spencer |
| 2011/0078230 A1 | 3/2011 | Sepulveda |
| 2011/0161461 A1 | 6/2011 | Niven-Jenkins |
| 2011/0182290 A1 | 7/2011 | Perkins |
| 2011/0196892 A1 | 8/2011 | Xia |
| 2011/0258614 A1 | 10/2011 | Tamm |
| 2011/0270964 A1 | 11/2011 | Huang et al. |
| 2011/0320522 A1 | 12/2011 | Endres et al. |
| 2012/0011190 A1 | 1/2012 | Driesen et al. |
| 2012/0023090 A1 | 1/2012 | Holloway et al. |
| 2012/0072600 A1 | 3/2012 | Richardson et al. |
| 2012/0078998 A1 | 3/2012 | Son et al. |
| 2012/0079096 A1 | 3/2012 | Cowan et al. |
| 2012/0079115 A1 | 3/2012 | Richardson et al. |
| 2012/0110515 A1 | 5/2012 | Abramoff et al. |
| 2012/0124184 A1 | 5/2012 | Sakata et al. |
| 2012/0143688 A1 | 6/2012 | Alexander |
| 2012/0179796 A1 | 7/2012 | Nagaraj et al. |
| 2012/0198071 A1 | 8/2012 | Black et al. |
| 2012/0224516 A1 | 9/2012 | Stojanovski et al. |
| 2012/0226649 A1 | 9/2012 | Kovacs et al. |
| 2012/0233329 A1 | 9/2012 | Dickinson et al. |
| 2012/0239725 A1 | 9/2012 | Hartrick et al. |
| 2012/0246129 A1 | 9/2012 | Rothschild et al. |
| 2012/0254961 A1 | 10/2012 | Kim et al. |
| 2012/0257628 A1 | 10/2012 | Bu et al. |
| 2012/0259954 A1 | 10/2012 | McCarthy et al. |
| 2012/0278229 A1 | 11/2012 | Vishwanathan et al. |
| 2012/0278831 A1 | 11/2012 | van Coppenolle et al. |
| 2013/0007273 A1 | 1/2013 | Baumback et al. |
| 2013/0034099 A1 | 2/2013 | Hikichi et al. |
| 2013/0054675 A1 | 2/2013 | Jenkins et al. |
| 2013/0055374 A1 | 2/2013 | Kustarz et al. |
| 2013/0067530 A1 | 3/2013 | Spektor et al. |
| 2013/0080577 A1 | 3/2013 | Taylor et al. |
| 2013/0080623 A1 | 3/2013 | Thireault |
| 2013/0080627 A1 | 3/2013 | Kukreja et al. |
| 2013/0080636 A1 | 3/2013 | Friedman et al. |
| 2013/0117282 A1 | 5/2013 | Mugali, Jr. et al. |
| 2013/0191499 A1 | 7/2013 | Ludin et al. |
| 2013/0219020 A1 | 8/2013 | McCarthy et al. |
| 2013/0254269 A1 | 9/2013 | Sivasubramanian et al. |
| 2013/0263256 A1 | 10/2013 | Dickinson et al. |
| 2013/0279335 A1 | 10/2013 | Ahmadi |
| 2013/0311583 A1 | 11/2013 | Humphreys et al. |
| 2013/0311989 A1 | 11/2013 | Ota et al. |
| 2013/0318153 A1 | 11/2013 | Sivasubramanian et al. |
| 2014/0007239 A1 | 1/2014 | Sharpe et al. |
| 2014/0019605 A1 | 1/2014 | Boberg |
| 2014/0022951 A1 | 1/2014 | Lemieux |
| 2014/0047104 A1 | 2/2014 | Rodriguez |
| 2014/0059120 A1 | 2/2014 | Richardson et al. |
| 2014/0082165 A1 | 3/2014 | Marr et al. |
| 2014/0082614 A1 | 3/2014 | Klein et al. |
| 2014/0108672 A1 | 4/2014 | Ou et al. |
| 2014/0122698 A1 | 5/2014 | Batrouni et al. |
| 2014/0122725 A1 | 5/2014 | Batrouni et al. |
| 2014/0137111 A1 | 5/2014 | Dees et al. |
| 2014/0149601 A1 | 5/2014 | Carney et al. |
| 2014/0164817 A1 | 6/2014 | Bartholomy et al. |
| 2014/0215019 A1 | 7/2014 | Ahrens |
| 2014/0280679 A1 | 9/2014 | Dey et al. |
| 2014/0337472 A1 | 11/2014 | Newton et al. |
| 2015/0006615 A1 | 1/2015 | Wainner et al. |
| 2015/0019686 A1 | 1/2015 | Backholm |
| 2015/0026407 A1 | 1/2015 | Mclellan et al. |
| 2015/0067171 A1 | 3/2015 | Yum |
| 2015/0074228 A1 | 3/2015 | Drake |
| 2015/0088972 A1 | 3/2015 | Brand et al. |
| 2015/0089621 A1 | 3/2015 | Khalid |
| 2015/0154051 A1 | 6/2015 | Kruglick |
| 2015/0156279 A1 | 6/2015 | Vaswani et al. |
| 2015/0188734 A1 | 7/2015 | Petrov |
| 2015/0189042 A1 | 7/2015 | Sun et al. |
| 2015/0215656 A1 | 7/2015 | Pulung et al. |
| 2015/0244580 A1 | 8/2015 | Saavedra |
| 2015/0288647 A1 | 10/2015 | Chhabra et al. |
| 2015/0319194 A1 | 11/2015 | Richardson et al. |
| 2015/0319260 A1 | 11/2015 | Watson |
| 2015/0334082 A1 | 11/2015 | Richardson et al. |
| 2016/0006672 A1 | 1/2016 | Saavedra |
| 2016/0021197 A1 | 1/2016 | Pogrebinsky et al. |
| 2016/0028755 A1 | 1/2016 | Vasseur et al. |
| 2016/0036857 A1 | 2/2016 | Foxhoven et al. |
| 2016/0072669 A1 | 3/2016 | Saavedra |
| 2016/0132600 A1 | 5/2016 | Woodhead et al. |
| 2016/0134492 A1 | 5/2016 | Ellsworth et al. |
| 2016/0142367 A1 | 5/2016 | Richardson et al. |
| 2016/0182454 A1 | 6/2016 | Phonsa et al. |
| 2016/0182542 A1 | 6/2016 | Staniford |
| 2016/0205062 A1 | 7/2016 | Mosert |
| 2016/0241637 A1 | 8/2016 | Marr et al. |
| 2016/0241639 A1 | 8/2016 | Brookins et al. |
| 2016/0241651 A1 | 8/2016 | Sivasubramanian et al. |
| 2016/0294678 A1 | 10/2016 | Khakpour et al. |
| 2016/0308959 A1 | 10/2016 | Richardson et al. |

(56) References Cited

U.S. PATENT DOCUMENTS

| | | |
|---|---|---|
| 2017/0041428 A1 | 2/2017 | Katsev |
| 2017/0085495 A1 | 3/2017 | Richardson et al. |
| 2017/0126557 A1 | 5/2017 | Richardson et al. |
| 2017/0126796 A1 | 5/2017 | Hollis et al. |
| 2017/0142062 A1 | 5/2017 | Richardson et al. |
| 2017/0153980 A1 | 6/2017 | Araújo et al. |
| 2017/0155678 A1 | 6/2017 | Araújo et al. |
| 2017/0180217 A1 | 6/2017 | Puchala et al. |
| 2017/0180267 A1 | 6/2017 | Puchala et al. |
| 2017/0214755 A1 | 7/2017 | Sivasubramanian et al. |
| 2017/0250821 A1 | 8/2017 | Richardson et al. |
| 2017/0257340 A1 | 9/2017 | Richardson et al. |
| 2017/0353395 A1 | 12/2017 | Richardson et al. |
| 2018/0063027 A1 | 3/2018 | Rafferty |
| 2018/0097631 A1 | 4/2018 | Uppal et al. |
| 2018/0097634 A1 | 4/2018 | Uppal et al. |
| 2018/0097831 A1 | 4/2018 | Uppal et al. |
| 2018/0109553 A1 | 4/2018 | Radlein et al. |

FOREIGN PATENT DOCUMENTS

| | | |
|---|---|---|
| JP | 07-141305 | 6/1995 |
| JP | 2002-024192 | 1/2002 |
| JP | 2002-323986 | 11/2002 |
| JP | 2004-070935 | 3/2004 |
| JP | 2004-532471 | 10/2004 |
| JP | 2005-537687 | 12/2005 |
| JP | 2007-207225 A | 8/2007 |
| JP | 2008-515106 | 5/2008 |
| JP | 2012-209623 | 10/2012 |
| WO | WO 2014/047073 A1 | 3/2014 |
| WO | WO 2017/106455 A1 | 6/2017 |

OTHER PUBLICATIONS

Office Action in Japanese Application No. 2014-225580 dated Oct. 26, 2015.
Second Office Action in Chinese Application No. 201180046104.0 dated Sep. 29, 2015.
Office Action in Canadian Application No. 2816612 dated Nov. 3, 2015.
"Non-Final Office Action dated Jan. 3, 2012," U.S. Appl. No. 12/652,541; dated Jan. 3, 2012; 35 pages.
"Content delivery network", Wikipedia, the free encyclopedia, Retrieved from the Internet: URL:http://en.wikipedia.org/w/index.php?title=Contentdeliverynetwork&oldid=601009970, XP055153445, Mar. 24, 2008.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.
First Office Action in Japanese Application No. 2011-502140 dated Dec. 7, 2012.
Second Office Action in Canadian Application No. 2741895 dated Oct. 21, 2013.
Office Action in Chinese Application No. 200780020255.2 dated Mar. 4, 2013.
Office Action in Indian Application No. 3742/KOLNP/2008 dated Nov. 22, 2013.
Office Action in Japanese Application No. 2012-052264 dated Dec. 11, 2012 in 26 pages.
Office Action in Japanese Application No. 2013-123086 dated Apr. 15, 2014 in 3 pages.
Office Action in Japanese Application No. 2013-123086 dated Dec. 2, 2014 in 2 pages.
Office Action in Russian Application No. 2015114568 dated May 16, 2016.
Office Action in Chinese Application No. 201310537815.9 dated Jul. 5, 2016.
Office Action in Chinese Application No. 201310717573.1 dated Jul. 29, 2016.
Office Action in Japanese Application No. 2011-502139 dated Aug. 17, 2015.
Office Action in Japanese Application No. 2011-516466 dated May 30, 2016.
Third Office Action in Chinese Application No. 201180046104.0 dated Apr. 14, 2016.
Office Action in Japanese Application No. 2015-533132 dated Apr. 25, 2016.
Office Action in Canadian Application No. 2884796 dated Apr. 28, 2016.
Office Action in Japanese Application No. 2015-075644 dated Apr. 5, 2016.
Office Action in Japanese Application No. 2014-225580 dated Oct. 3, 2016.
Partial Supplementary Search Report in European Application No. 09826977.2 dated Oct. 4, 2016.
Decision of Rejection in Chinese Application No. 201180046104.0 dated Oct. 17, 2016.
Office Action in Canadian Application No. 2816612 dated Oct. 7, 2016.
International Search Report and Written Opinion in PCT/US2016/066848 dated May 1, 2017.
Guo, F., Understanding Memory Resource Management in Vmware vSphere 5.0, Vmware, 2011, pp. 1-29.
Hameed, CC, "Disk Fragmentation and System Performance", Mar. 14, 2008, 3 pages.
Liu, "The Ultimate Guide to Preventing DNS-based DDoS Attacks", Retrieved from http://www.infoworld.com/article/2612835/security/the-ultimate-guide-to-preventing-dns-based-ddos-attacks.html, Published Oct. 30, 2013.
Ragan, "Three Types of DNS Attacks and How to Deal with Them", Retrieved from http://www.csoonline.com/article/2133916/malware-cybercrime/three-types-of-dns-attacks-and-how-to-deal-with-them.html, Published Aug. 28, 2013.
Office Action in European Application No. 09839809.2 dated Dec. 8, 2016.
Office Action in European Application No. 11767118.0 dated Feb. 3, 2017.
Office Action in Canadian Application No. 2816612 dated Aug. 8, 2017.
Krsul et al., "VMPlants: Providing and Managing Virtual Machine Execution Environments for Grid Computing", Nov. 6, 2004 (Nov. 6, 2004), Supercomputing, 2004. Proceedings of the ACM/IEEE SC2004 Conference Pittsburgh, PA, USA Nov. 6-12, 2004, Piscataway, NJ, USA, IEEE, 1730 Massachusetts Ave., NW Washington, DC 20036-1992 USA, 12 pages.
Zhao et al., "Distributed file system support for virtual machines in grid computing", Jun. 4, 2004 (Jun. 4, 2004), High Performance Distributed Computing, 2004. Proceedings. 13th IEEE International Symposium on Honolulu, HI, USA Jun. 4-6, 2004, Piscataway, NJ, USA, IEEE, p. 202-211.
Office Action in Indian Application No. 5937/CHENP/2010 dated Jan. 19, 2018.
Office Action in Indian Application No. 6210/CHENP/2010 dated Mar. 27, 2018.
Office Action in Chinese Application No. 201310537815.9 dated Feb. 1, 2018.
Office Action in European Application No. 07754164.7 dated Jan. 25, 2018.
International Search Report and Written Opinion in PCT/US2017/055156 dated Dec. 13, 2017.
Supplementary Examination Report in Singapore Application No. 11201501987U dated May 17, 2017.
Office Action in Chinese Application No. 201310537815.9 dated Jun. 2, 2017.

MANAGING RESOURCES USING RESOURCE EXPIRATION DATA

This application is a continuation of U.S. patent application Ser. No. 14/331,067, now U.S. Pat. No. 9,176,894, entitled "MANAGING RESOURCES USING RESOURCE EXPIRATION DATA" and filed on Jul. 14, 2014, which in turn is a continuation of U.S. patent application Ser. No. 12/485,783, now U.S. Pat. No. 8,782,236, entitled "MANAGING RESOURCES USING RESOURCE EXPIRATION DATA" and filed on Jun. 16, 2009, the disclosures of which are incorporated herein by reference.

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider would provide client computing devices data associated with the Web page as well as the data associated with the embedded resources.

Some content providers attempt to facilitate the delivery of requested content, such as Web pages and/or resources identified in Web pages, through the utilization of a content delivery network ("CDN") service provider. A CDN server provider typically maintains a number of computing devices in a communication network that can maintain content from various content providers. In turn, content providers can instruct, or otherwise suggest to, client computing devices to request some, or all, of the content provider's content from the CDN service provider's computing devices.

With reference to previous illustrative example, the content provider can leverage a CDN service provider with the modification or substitution of resource identifiers associated with the embedded resources. Specifically, the resource identifiers can reference a computing device associated with the CDN service provider such that the client computing device would transmit the request for the additional resources to the referenced CDN service provider computing device. Typically, the content provider facilitates the utilization of a CDN provider by including CDN-provider specific resources identifiers in requested content (e.g., Web pages). This approach generally corresponds to an "offline" process implemented by the content provider in advance of receipt of a request for the original content from the client computing devices. Accordingly, modifications to resource identifiers, such as to provide alternative resources identifiers for the same CDN service provider, to provide additional information utilized by CDN service providers in processing the request for content and/or to identify alternative CDN service providers, can become inefficient as they typically require implementation of the offline process the content provider.

As with content providers, CDN providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
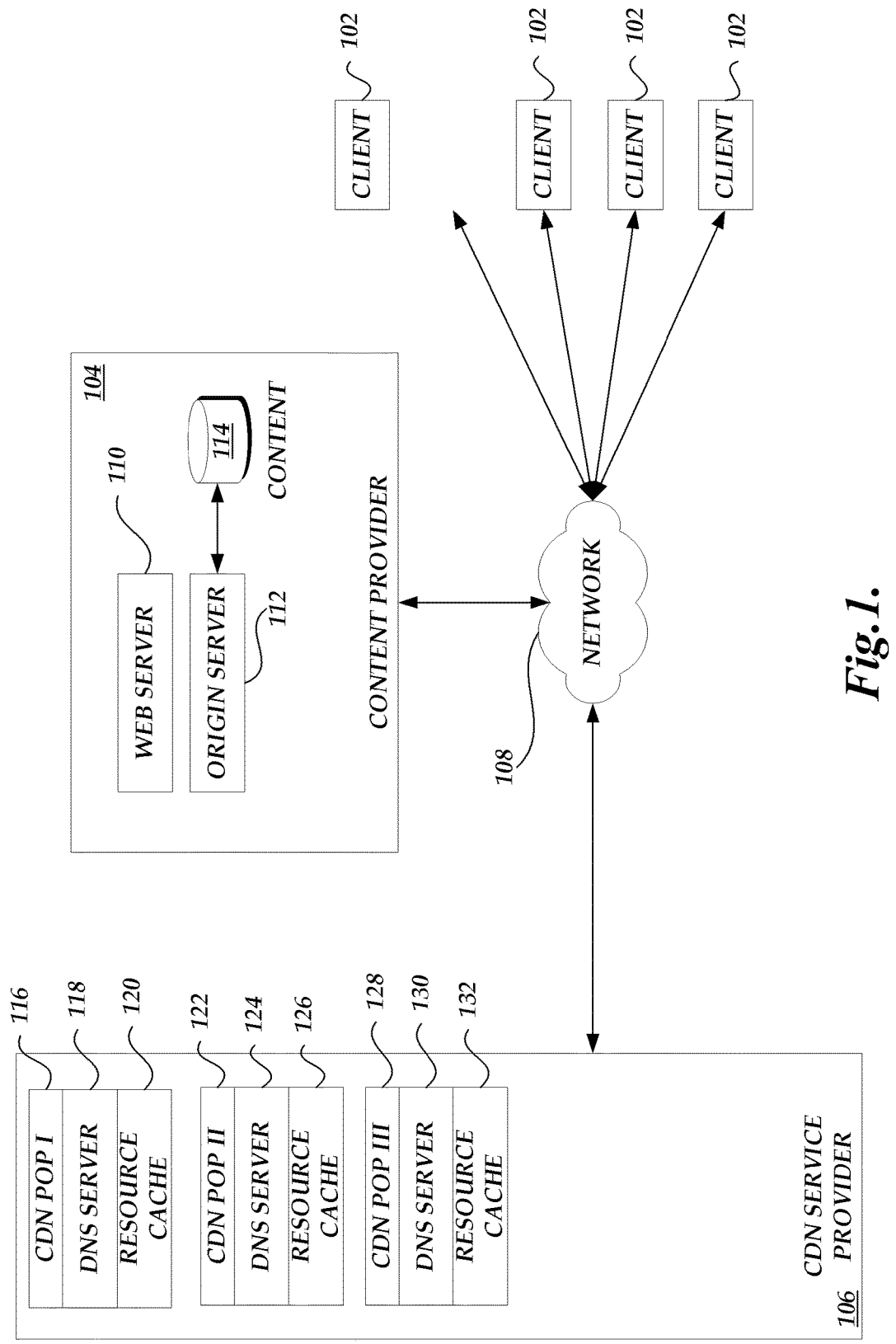
FIG. 1 is a block diagram illustrative of content delivery environment including a number of client computing devices, content provider, a content delivery network service provider, and a network computing and storage provider.

Generally described, the present disclosure is directed to content management techniques for responding to resource requests from a client computing device to a network computing component via a content delivery network ("CDN"). Specifically, aspects of the disclosure will be described with regard to management of resources within a resource cache component hierarchy. The management of the objects can be implemented in a manner such that the most frequently requested content (e.g., most popular resources) is available for delivery by the most accessible portions of the resource cache component hierarchy. Additionally, less frequently requested content can be distributed within the resource cache component hierarchy to less accessible portions of the resource cache component hierarchy. Although various aspects of the disclosure will be described with regard to illustrative examples and embodiments, one skilled in the art will appreciate that the disclosed embodiments and examples should not be construed as limiting.

A service provider, such as a CDN service provider, can maintain a hierarchy of cache server components to provide cached resources. In certain embodiments, a service provider can manage resource expiration data associated with the resources maintained in the resource cache component hierarchy as indicative of the popularity, or relative popularity, of the resource. In the discussion below, embodiments are discussed with respect to expiration data that can be described as a time to live, after which the cache server component deletes the resource, designates the resource as stale or allows the storage location corresponding to the expired resource to be overwritten. Accordingly, the expiration data may be specified in terms of a measured unit of time. However, one skilled in the relevant art will appreciate that the expiration data may be specified in terms of other measurable activities, such as frequency of requests, and the like.

Traditionally, cache server components within a cache server hierarchy associate resource expiration data such that the most recently requested resource is associated with the highest expiration data (e.g., the most recently requested resource is associated with the longest time to live). In this embodiment, however, the cache server components within the resource cache component hierarchy assign expiration data, such as a resident time, to resources based upon the position of the respective cache server component within the resource cache component hierarchy and the relative frequency in which the resource has been requested. Specifically, in one example, resources are assigned shorter expiration data for the cache servers at the lowest levels of the resource cache component hierarchy that are typically the primary cache components fielding resource requests. The lowest level of the resource cache component hierarchy is often referred to as the "edge" of the resource cache component hierarchy. Additionally, resources are assigned longer expiration data in successively higher levels of the resource cache component hierarchy. Additionally, the expiration data for a given resource may be modified by a cache server component when a request for that resource is received by that cache server component such that content will reside within the various cache server components according to the frequency in which the content is requested by client computing devices.

For less popular resources, the resource will migrate through the cache server components of a resource cache component hierarchy as the expiration data expires unless subsequent requests for the resources are received. In one example, a newly obtained resource is cached through several components of a resource cache component hierarchy after the processing of the initial request for the resource. At each level of the resource cache component hierarchy, the resource is associated with shorter expiration data, such that the shortest expiration data with be assigned at the edge of a resource cache component hierarchy. If the requested resource is not requested, the version of the resource stored at each level of the hierarchy will successively expire. Thus, the expiration of the version of the resource has the effect of "pushing" the resource up the resource cache component hierarchy, in which the version of the resource is associated with longer expiration data. Subsequent requests for the resource at the edge servers may then cause the edge servers to request the resource from the cache server components higher in the resource cache component hierarchy. In another example, if the cache server components receive requests for the resource prior to the expiration of the expiration data, the expiration data is reset and the resource is maintained at the cache server component and the expiration data does not need to be modified. Thus, more popular content may be maintained at the edge cache servers, as their expiration data may be frequently reset.

FIG. 1 is a block diagram illustrative of a content delivery environment 100 for the management and processing of content requests. As illustrated in FIG. 1, the content delivery environment 100 includes a number of client computing devices 102 (generally referred to as clients) for requesting content from a content provider and/or a CDN service provider. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS name server, that generates the DNS queries attributed to the client computing device. In one embodiment, the local DNS resolver component may be provided by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102. The content provider 104 can further include an origin server component 112 and associated storage component 114 corresponding to one or more computing devices for obtaining and processing requests for network resources from the CDN service provider.

One skilled in the relevant art will appreciate that the content provider 104 can be associated with various additional computing resources, such additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider (e.g., return an IP address responsive to the DNS query). A DNS name server component is considered to be authoritative to a DNS query if the DNS name server can completely resolve the query by providing a responsive IP address. Additionally, the content provider 104 may omit some of the components illustrated in FIG. 1, such as the origin server 112.

With continued reference to FIG. 1, the content delivery environment 100 can further include a CDN service provider 106 in communication with the one or more client computing devices 102 and the content provider 104 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each CDN POP 116, 122, 128 includes a DNS component 118, 124, 130 made up of a number of DNS server computing devices for resolving DNS queries from the client computers 102.

Each CDN POP 116, 122, 128 also includes a resource cache component 120, 126, 132 made up of a number of cache server computing devices for storing resources from content providers and transmitting various requested resources to various client computers. The DNS components 118, 124 and 130 and the resource cache components 120, 126, 132 may further include additional software and/or hardware components that facilitate communications including, but not limited to, load balancing or load sharing software/hardware components.

As discussed in detail with respect to FIGS. 6A-6B below, the resource cache components may be logically organized in a hierarchy, where resource cache components located close to client computing devices (e.g., edge cache components) populate the lower levels of the resource cache component hierarchy and resource cache components located further from the client computing devices populate the higher levels of the resource cache component hierarchy. Still further, the resource cache components 120, 126, 132 may include hardware and/or software components for tracking the expiration of resources stored on behalf of one or more various content providers 104. In an embodiment, the expiration tracking components may assign an expiration time (e.g., time to live) to at least a portion of the resources stored within their respective resource cache component and provided to other resource cache components with the cache server hierarchy. In another embodiment, the expiration tracking components can monitor a residence time during which resources are stored by their resource cache component. The expiration time and residence time may be employed by the resource cache components 120, 126, 132 for expiring stored resources.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1 as logically associated with the CDN service provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such as additional computing devices for administration of content and resources, and the like. Still further, although the resource cache components 120, 126, 132 are discussed as being associated with the CDN service provider 106, one skilled in the relevant art will appreciate that the resource cache components 120, 126, 132 may be provided different service providers, independently or on behalf content provider 104 or CDN server provider 106.

With reference now to FIGS. 2-6, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
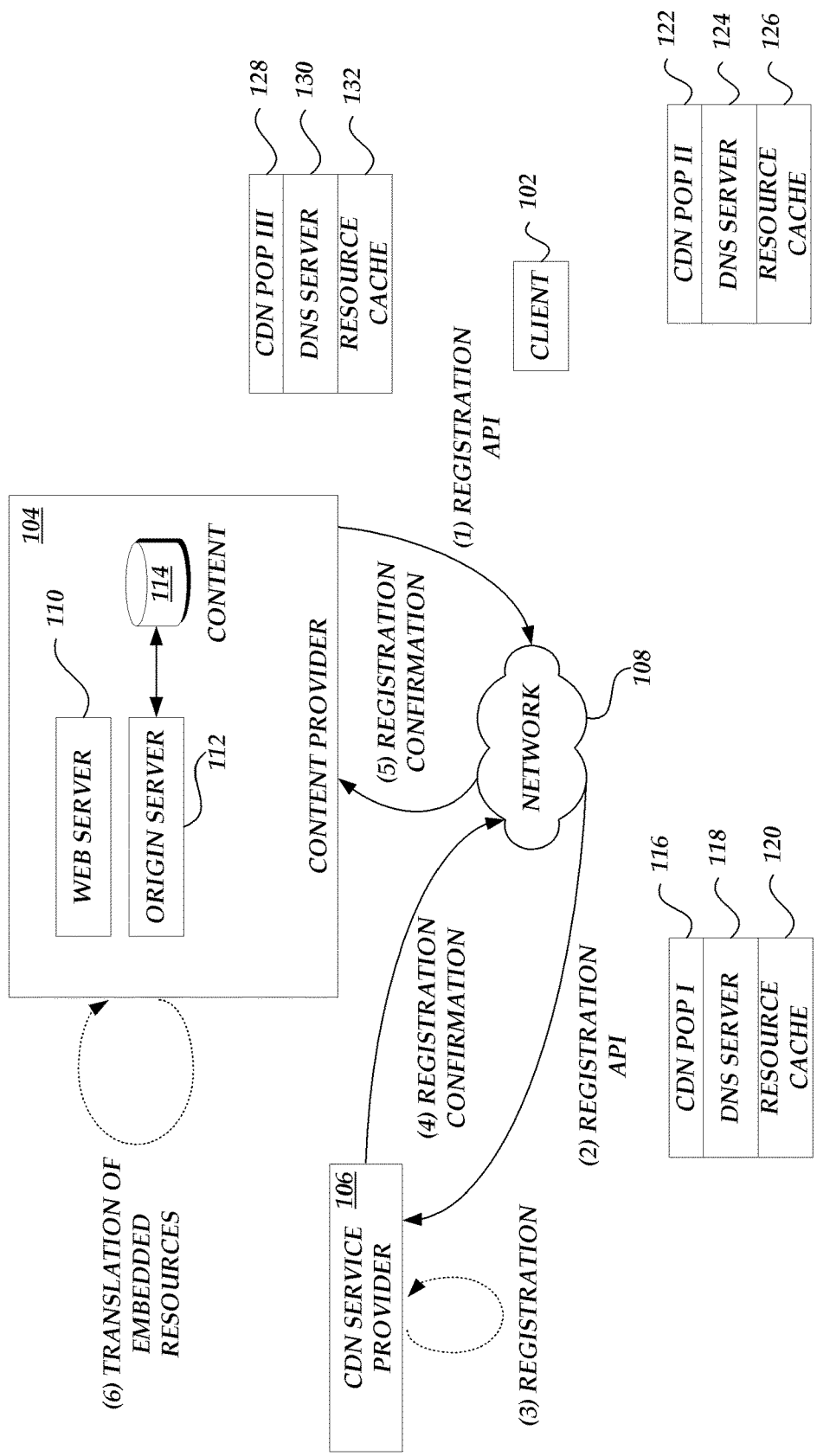
FIG. 2 is a block diagram of the content delivery environment of FIG. 1 illustrating the registration of a content provider with a content delivery network service provider.

With reference to FIG. 2, an illustrative interaction for registration of a content provider 104 with the CDN service provider 106 will be described. As illustrated in FIG. 2, the CDN content registration process begins with registration of the content provider 104 with the CDN service provider 106. In an illustrative embodiment, the content provider 104 utilizes a registration application program interface ("API") to register with the CDN service provider 106 such that the CDN service provider 106 can provide content on behalf of the content provider 104. The registration API includes the identification of the origin server 112 of the content provider 104 that will provide requested resources to the CDN service provider 106. Additionally, the registration API can further facilitate the specification of content provider service levels, financial cost criteria, or other content provider specified criteria that can be utilized by the CDN service provider 106 in request routing processing.

One skilled in the relevant art will appreciate that upon identification of appropriate origin servers 112, the content provider 104 can begin to direct requests for content from client computing devices 102 to the CDN service provider 106. Specifically, in accordance with DNS routing principles, a client computing device request corresponding to a resource identifier would eventually be directed toward a CDN POP 116, 122, 128 associated with the CDN service provider 106. In the event that the resource cache component 120, 126, 132 of a selected CDN POP does not have a copy of a resource requested by a client computing device 102, owing to the expiration of the resource from the resource cache component 120, 126, 132 of the selected CDN POP in accordance with the expiration data assigned to the resource, the resource cache component 120, 126, 132 will request the resource. Such a resource request may be directed to one or more hierarchically superior resource cache components or, if the resource is also absent from these hierarchically superior resource cache components, the origin server 112 previously registered by the content provider 104.

With continued reference to FIG. 2, upon receiving the registration API, the CDN service provider 106 obtains and processes the registration information. In an illustrative embodiment, the CDN service provider 106 can then generate additional information that will be used by the client computing devices 102 as part of the content requests. The additional information can include, without limitation, client identifiers, such as client identification codes, content provider identifiers, such as content provider identification codes, executable code for processing resource identifiers, such as script-based instructions, the like. In another embodiment, in addition or alternatively, the additional information can include file type identifiers which can include file type information. Additional information may also include or be associated with requirements for selecting a POP for processing the requested content, such as quality of service criteria which can include information as to compression rates, processing power, processing speed, and/or bandwidth of the POP, and the like. One skilled in the relevant art will appreciate that various types of additional information may be generated by the CDN service provider 106 and that the additional information may be embodied in any one of a variety of formats.

The CDN service provider 106 returns an identification of applicable domains for the CDN service provider (unless it has been previously provided) and any additional information to the content provider 104. In turn, the content provider 104 can then process the stored content with content provider specific information. In one example, as illustrated in FIG. 2, the content provider 104 translates resource identifiers originally directed toward a domain of the origin server 112 to a domain corresponding to the CDN service provider. The translated URLs are embedded into requested content in a manner such that DNS queries for the translated URLs will resolve to a DNS server corresponding to the CDN service provider 106 and not a DNS server corresponding to the content provider 104.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provider, the resource identifiers can be referred to generally as the "content provider URL." For purposes of an illustrative example, the content provider URL can identify a domain of the content provider 104 (e.g., contentprovider.com), generally referred to as a DNS portion of the URL, a name of the resource to be requested (e.g., "resource.jpg") and a path where the resource will be found (e.g., "path"), the path and resource generally referred to as a path portion of the URL. In this illustrative example, the content provider URL has the form of:

http://www.contentprovider.com/path/resource.jpg

During an illustrative translation process, the content provider URL is modified such that requests for the resources associated with the translated URLs resolve to a CDN POP associated with the CDN service provider 106. In one embodiment, the translated URL identifies the domain of the CDN service provider 106 (e.g., "cdnprovider.com"), the same name of the resource to be requested (e.g., "resource.xxx") and the same path where the resource will be found (e.g., "path"). One skilled in the relevant art will appreciate that the name information and the path information is not accessible to a DNS name server as a part of DNS query processing. Accordingly, the portion of the URL including the domain and any preceding information is generally referred to as the "DNS portion" of the URL.

Additionally, the translated URL can include additional processing information (e.g., "additional information") in the DNS portion of the URL. The additional information can correspond to any one of a variety of information utilized by the CDN service provider 106 to process a corresponding DNS query. The translated URL would have the form of:

http://additional_information.cdnprovider.com/path/resource.xxx

Figure 3:
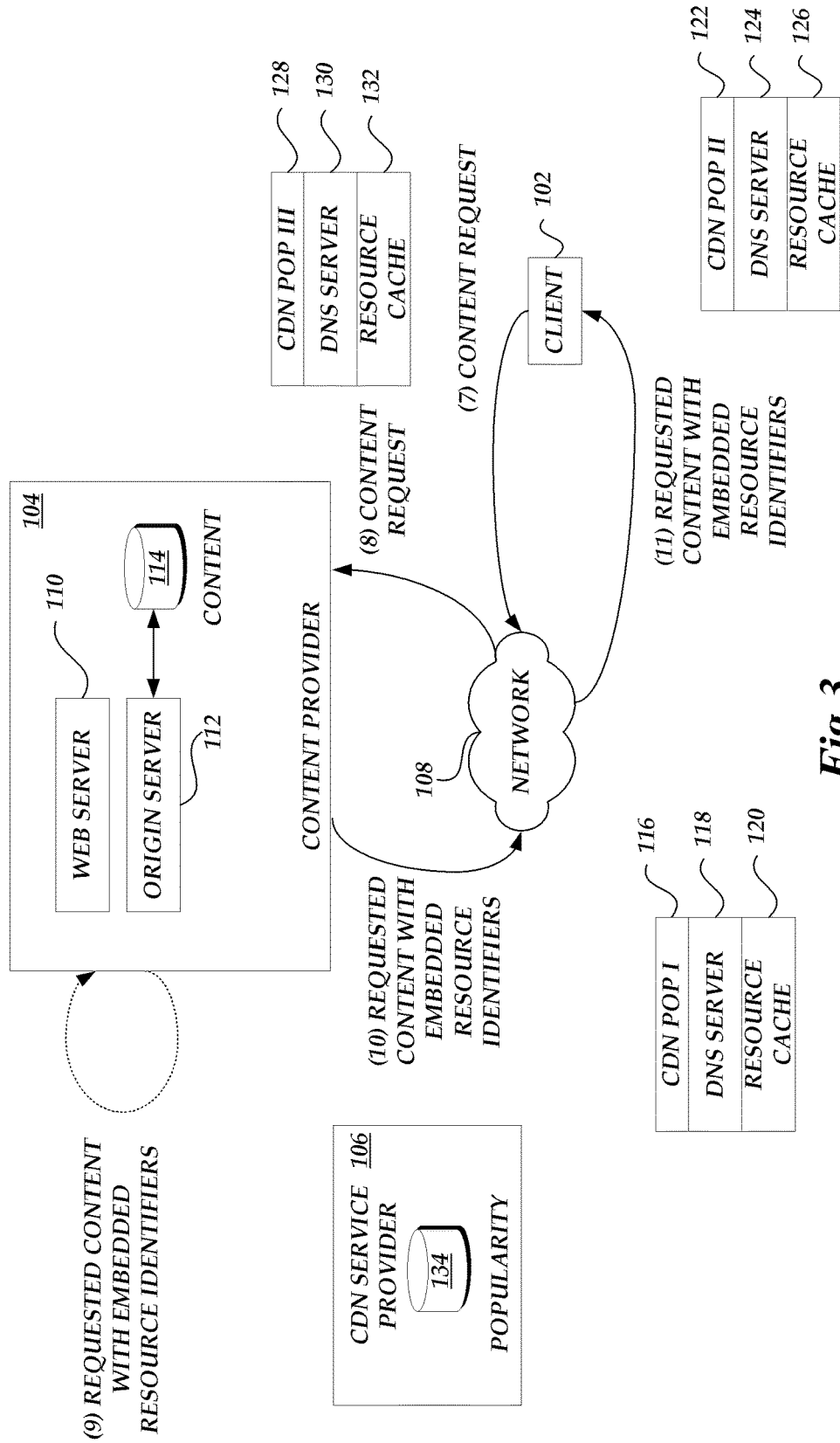
FIG. 3 is a block diagram of the content delivery environment of FIG. 1 illustrating the generation and processing of a content request from a client computing device to a content provider.

In another embodiment, the information associated with the CDN service provider 106 is included in a modified URL, such as through prepending or other techniques, such that the translated URL can maintain all of the information associated with the original URL. In this embodiment, the translated URL would have the form of:

http://additional_information.cdnprovider.com/www.contentprovider.com/path/resource.xxx With reference now to FIG. 3, after completion of the registration and translation processes illustrated in FIG. 2, a client computing device 102 subsequently generates a content request that is received and processed by the content provider 104, such as through the Web server 110. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers, described above, that corresponds to resource objects that should be obtained by the client computing device 102 as part of the processing of the requested content. The embedded resource identifiers can be generally referred to as original resource identifiers or original URLs.

Upon receipt of the requested content, the client computing device 102, such as through a browser software application, begins processing any of the markup code included in the content and attempts to acquire the resources identified by the embedded resource identifiers. Accordingly, the first step in acquiring the content corresponds to the issuance, by the client computing device 102 (through its local DNS resolver), of a DNS query for the original URL resource identifier that results in the identification of a DNS server authoritative to the "." and the "com" portions of the translated URL. After resolving the "." and "com" portions of the embedded URL, the client computing device 102 then issues a DNS query for the resource URL that results in the identification of a DNS server authoritative to the ".cdnprovider" portion of the embedded URL. The issuance of DNS queries corresponding to the "." and the "com" portions of a URL are well known and have not been illustrated.

Figure 4:
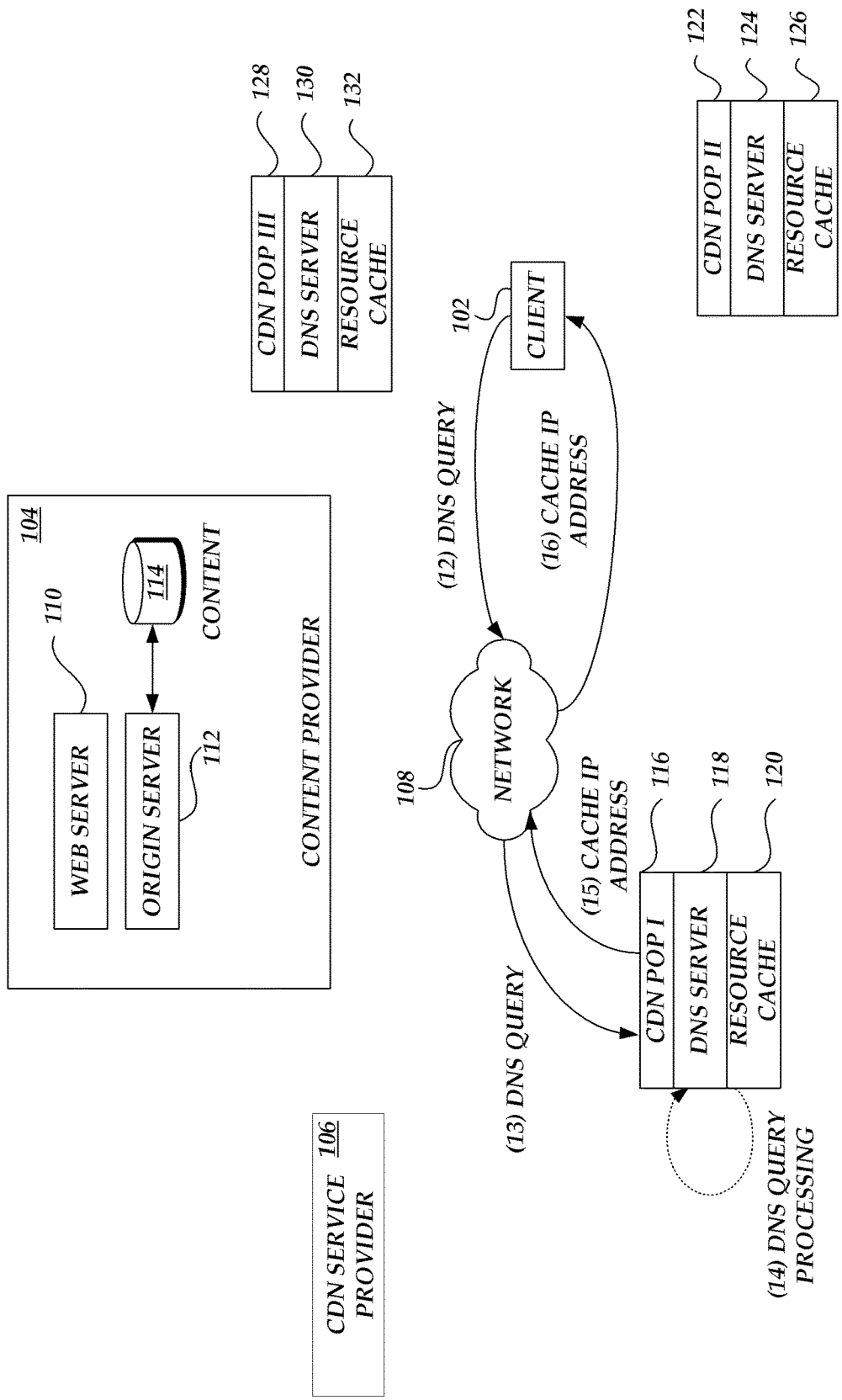
FIG. 4 is a block diagram of the content delivery environment of FIG. 1 illustrating one embodiment of the generation and processing of a DNS query corresponding to an embedded resource from a client computing device to a content delivery network service provider.

With reference now to FIG. 4, in an illustrative embodiment, the successful resolution of the "cdnprovider" portion of the original URL identifies a network address, such as an IP address, of a DNS server associated with the CDN service provider 106. In one embodiment, the IP address can be a specific network address unique to a DNS server component of a POP. In another embodiment, the IP address can be shared by one or more CDN POPs. In this embodiment, a further DNS query to the shared IP address utilizes a one-to-many network routing schema, such as anycast, such that a specific POP will receive the request as a function of network topology. For example, in an anycast implementation, a DNS query issued by a client computing device 102 to a shared IP address will arrive at a DNS server component logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a POP. It will be appreciated by one skilled in the relevant art that a number of ways exist to determine network topology distance.

With continued reference to FIG. 4, in either of the above identified embodiments (or any other embodiment), a specific DNS server in the DNS component 118 of a CDN POP 116 receives the DNS query corresponding to the original URL from the client computing device 102. Once one of the DNS servers in the DNS component 118 receives the request, the specific DNS server attempts to resolve the request. In one illustrative embodiment as shown in FIG. 4, a specific DNS server resolves the DNS query by identifying an IP address of a cache server component that will process the request for the requested resource. As will be described further below in reference to FIG. 6, a selected resource cache component can process the request by either providing the requested resource if it is available or attempting to obtain the requested resource from another source, such as a peer cache server computing device, a hierarchically superior cache server computing device, or the origin server 112 of the content provider 104.

The CDN service provider 106 can utilize the additional information (e.g., the "additional information") included in the modified URL to select a more appropriate POP. In one aspect, the CDN service provider 106 can utilize the additional information to select from a set of DNS name servers identified as satisfying routing criteria including, but are not limited to, financial cost to content provider 104, network performance (e.g., "internet weather") service level criteria, content provider specified, etc.

In one example, the CDN service provider 106 can attempt to direct a DNS query to DNS severs according to geographic criteria. The geographic criteria can correspond to a geographic-based regional service plans contracted between the CDN service-provider 106 and the content provider 104 in which various CDN service provider 106 POPs are grouped into geographic regions. Accordingly, a client computing device 102 DNS query received in a region not corresponding to the content provider's regional plan may be better processed by a DNS name server in region corresponding to the content provider's regional plan. In this example, the DNS component 118 may also obtain geographic information from the client directly (such as information provided by the client computing device or ISP) or indirectly (such as inferred through a client computing device's IP address).

In still a further example, the CDN service provider 106 can attempt to direct a DNS query to DNS servers according to network performance criteria. The network performance criteria can correspond to measurements of network performance for transmitting data from the CDN service provider POPs to the client computing device 102. Examples of network performance metrics can include network data transfer latencies (measured by the client computing device or the CDN service provider 106, network data error rates, and the like.

In an illustrative embodiment, the specific DNS server can utilize a variety of information in selecting a resource cache component. In one illustrative embodiment, the DNS server can use the additional information in the DNS portion of the resource identifier (which is used to resolve the DNS query by the DNS server) to return an IP address of a resource cache component. In another example, the DNS name server component can default to a selection of a resource cache component of the same POP. In another example, the DNS name server components can select a resource cache component based on various load balancing or load sharing algorithms. Still further, the DNS name server components can utilize network performance metrics or measurements to assign specific resource cache components. The IP address selected by a DNS name server component may correspond to a specific caching server in the resource cache. Alternatively, the IP address can correspond to a hardware/software selection component (such as a load balancer).

Even further, the DNS server can also use information obtained directly from a client computing device (such as information provided by the client computing device or ISP) or indirectly (such as inferred through a client computing device's IP address) to select a resource cache component. Such client computing device information can, for example, be geographic information. Still further, the DNS server components can utilize network performance metrics or measurements, as discussed above, to assign specific resource cache components.

Figure 5:
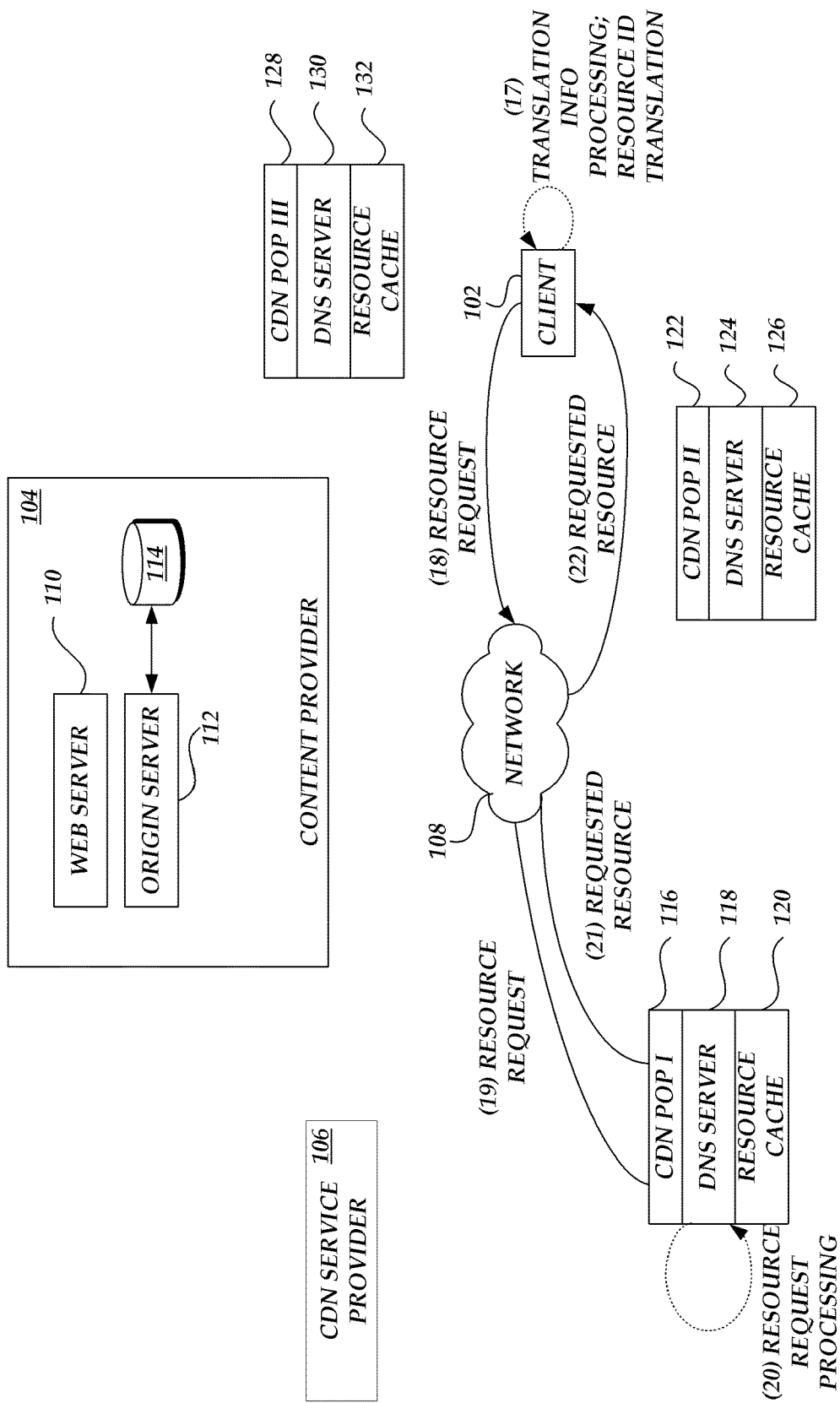
FIG. 5 is a block diagram of the content delivery environment of FIG. 1 illustrating the generation and processing of embedded resource requests from a client computing device to a content delivery network service provider.

With reference now to FIG. 5, in an illustrative example, assume that the DNS component 118 has resolved the received DNS query by returning the IP address of the resource cache component 120 of POP 116. Upon receipt of the IP address for the resource cache component 120, the client computing device 102 transmits requests for the requested content to the resource cache component 120.

Figure 6A:
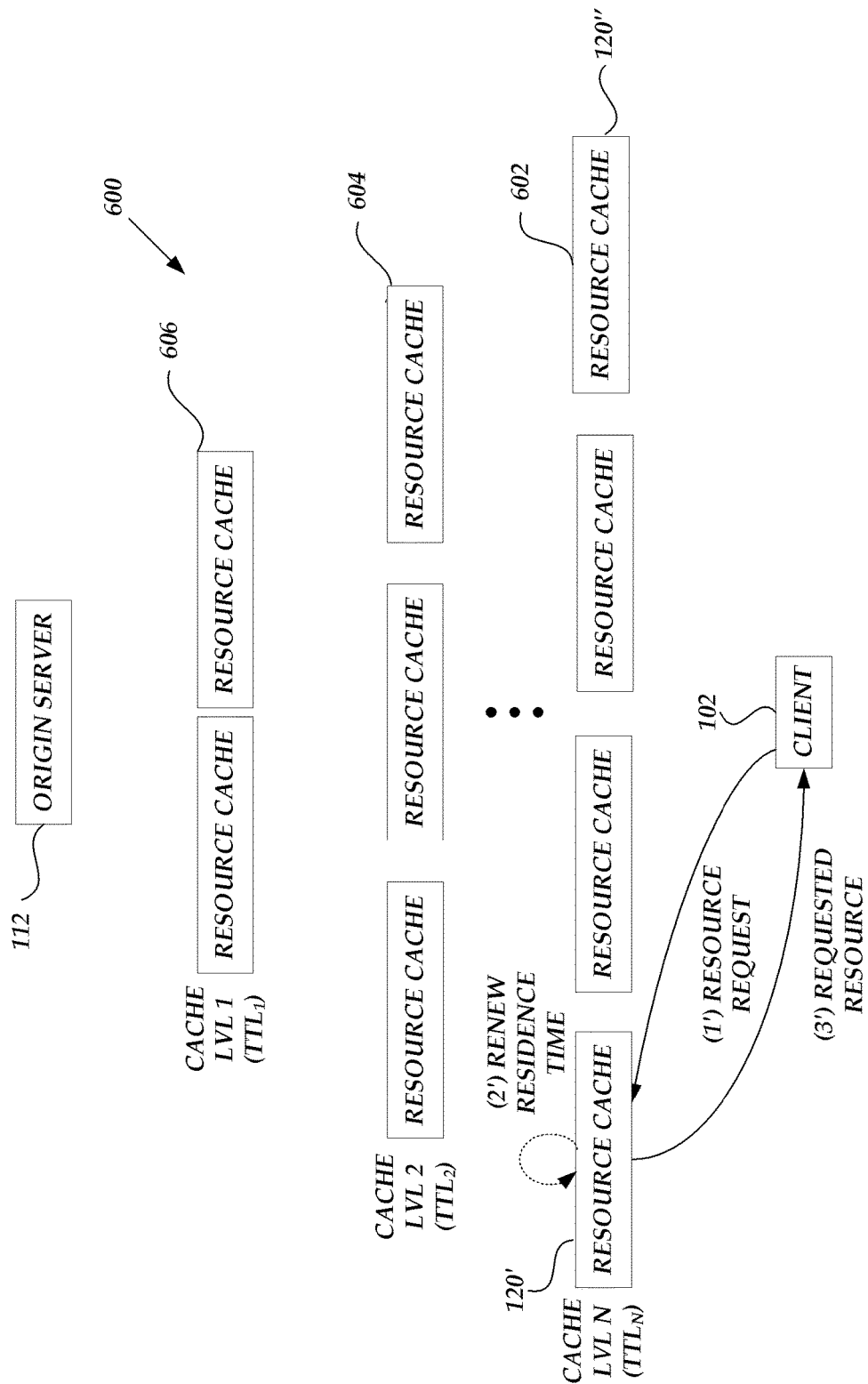
FIGS. 6A-6B are block diagrams of a hierarchy of cache server components illustrative of the processing of content requests.
Figure 6B:
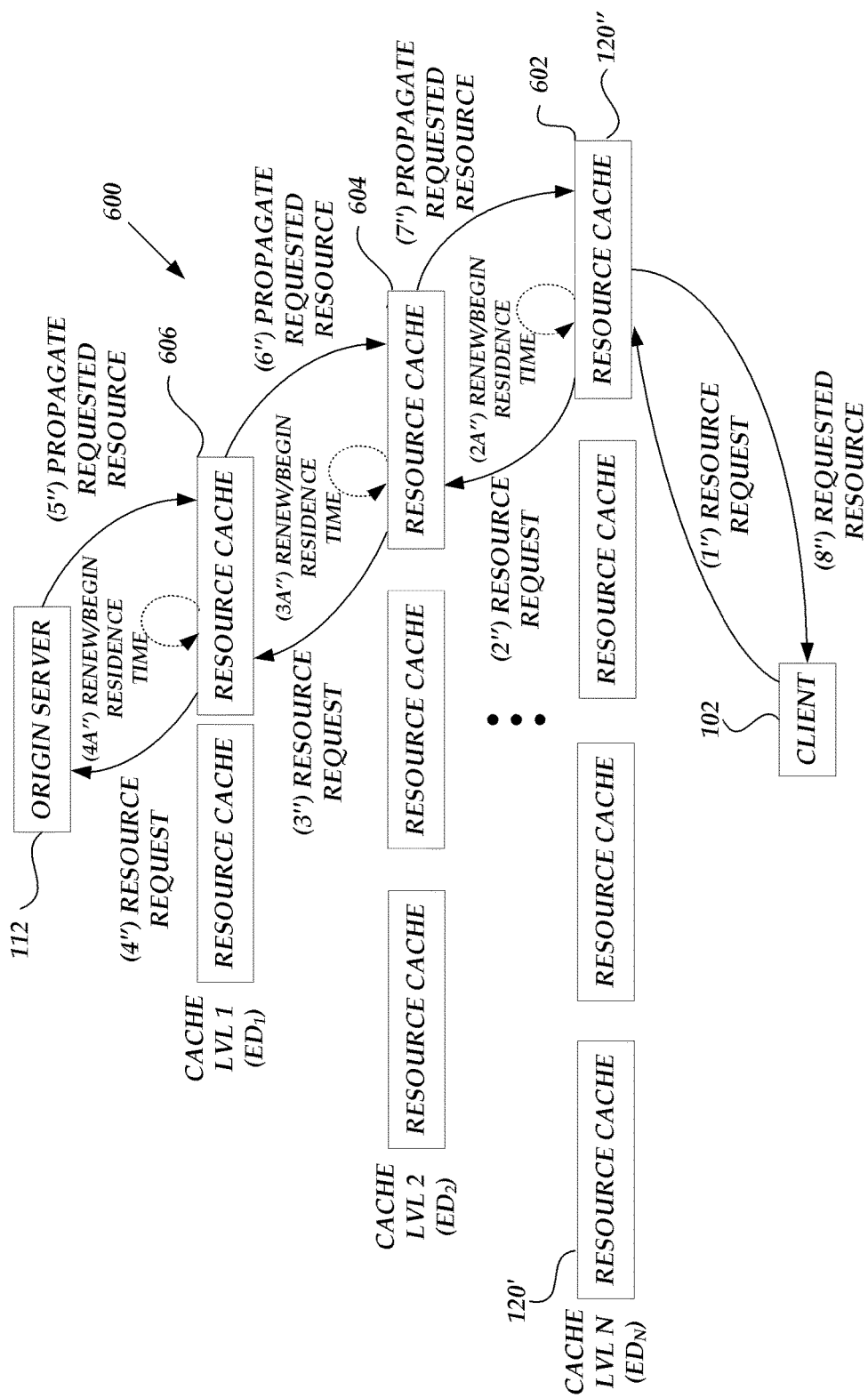

With reference to FIGS. 6A-6B, the resource cache component 120 processes the request and the requested resource is transmitted to the client computing device 102. FIG. 6 illustrates one embodiment of a hierarchy of cache server components 600, including resource cache component 120 of POP 116 selected to respond to the DNS query from the client computing device 102. For clarity in discussing various embodiments, the resource cache component 120 will be referred to as cache component 120' and 120".

The resource cache component hierarchy 600 illustrated in FIGS. 6A-6B comprises a plurality of resource cache components that are logically organized in levels. Resource cache components residing on the same logical level as the resource cache component of interest (e.g., cache server component 120) are referred to as peers, while resource cache components residing at a higher logical level as the resource cache component of interest are referred to as hierarchically superior or parent cache components. At the top of the hierarchy is the origin server 112 of the content provider, as any resource to be maintained by one or more resource cache components of the resource cache component hierarchy may ultimately retrieved from the origin server 112, in the event that the resource is not maintained by a peer or parent resource cache component.

Each resource cache component includes tracking components, which may include hardware and/or software components for management of stored resources according to expiration data. In an embodiment, the tracking components may allow the resource cache component to assign expiration data, such as a time to live, to at least a portion of the resources maintained by the respective resource cache component. The assigned time to live may be varied in accordance with the relative position of the logical level within the resource cache component hierarchy 600 and based, at least in part, on resource request parameters. In one embodiment, resource cache components located at a relatively low position within the resource cache component hierarchy 600, such as cache level N of FIGS. 6A-6B, will assign a relatively short time to live to their stored resources, while resource cache components located at a relatively high position within the resource cache component hierarchy 600, such as cache level 1 of FIGS. 6A-6B, will assign a relatively longer time to live to their stored resources.

The tracking components may enable the resource cache components to monitor a residence time for each of the stored resources, which represents a time duration over which each of the resources has been stored by their respective resource cache component from a selected starting time. In one embodiment, the residence time of a resource may be measured starting from the time at which the resource is stored by the resource cache component or the time at which a request for the resource is received by the resource cache component, whichever is more recent.

The resource cache components may further employ the assigned expiration data and monitored residence time in order to make expiration decisions regarding expiration of their stored resources. For example, when the residence time of a resource exceeds the time to live assigned to the resource, the resource may be deleted from the resource cache component. In this manner, because the time to live assigned by resource cache components increases when moving upwards in the resource cache component hierarchy 600, resource cache components will expire from the bottom up within the resource cache component hierarchy 600.

Similarly, in further reference to FIGS. 6A-6B, resources may be maintained at the lower levels of the resource cache component hierarchy or propagated down to the lower levels of the resource cache component hierarchy 600. In another example illustrated in FIG. 6A, assume that a resource request is received by resource cache component 120', which maintains the requested resource in storage. When receiving the resource request, the resource cache component 120' determines that it maintains the requested resource in storage, renews the residence time of the requested resource, and returns the requested resource to the client computing device 102. In this manner, because the residence time of the requested resource may be renewed, the resource will be retained by the resource cache component 120' until such time as the residence time of the resource exceeds the time to live of the resource.

In a further example illustrated in FIG. 6B, assume that a resource request is received by resource cache component 120" which does not initially maintain the requested resource in storage. When receiving the resource request, the resource cache component 120" determines that it does not maintain the requested resource in storage or that a previously stored copy of the resource is no longer valid, or otherwise unknown. Accordingly, the resource cache component 120" requests the resource from a parent resource cache component, such as resource cache component 604. Should the requested resource not be available from the parent resource cache component 604, further requests for the resource will be transmitted up the resource cache component hierarchy to other parent cache components (e.g., resource cache 606), or even to the origin server 112, until a computing device that maintains the requested resource in storage is found.

Upon identification of the requested resource components, the residence time of the requested resource is set at an initial value on the resource cache component in which the requested resource is found. Illustratively, the residence time is set, at least in part, based on the relative location of the resource cache component within the resource cache component hierarchy 600. For example, the top resource cache component 606 can set an initial value for the resident time associated with the requested resource such that the resource will be maintained within the resource cache component hierarchy 600. In one example, the initial value for the resident time associated with the requested resource can be set at a minimum value for each lower level within the resource cache component hierarchy. In this example, resources which are frequently requested may be propagated down to the lower levels of the resource cache component hierarchy. Likewise, resources that are less frequently requested will expire on each of the lower levels of the resource cache component hierarchy 600. Accordingly, upon a subsequent request for the resource (after expiration), the resource can be associated with a longer resident time.

In another example, the initial value for the resident time for the resource maintained at each level in the resource cache component hierarchy 600 can be set to various minimums associated with the specific level of the resource cache component within the hierarchy. In such an embodiment, the resident time can be set in accordance with historical information for that particular resource or for the resource cache component. For example, the resident time may be set at the average resident time for some set of resources stored at the particular resource cache component. In another example, the resident time may be fixed for particular levels of the resource cache component hierarchy 600, such as a minimum resident time for the lowest levels of the resource cache component hierarchy 600, often referred to as the edge of the hierarchy. In such an example, the resident times for resources may or may not be adjusted.

Figure 7A:
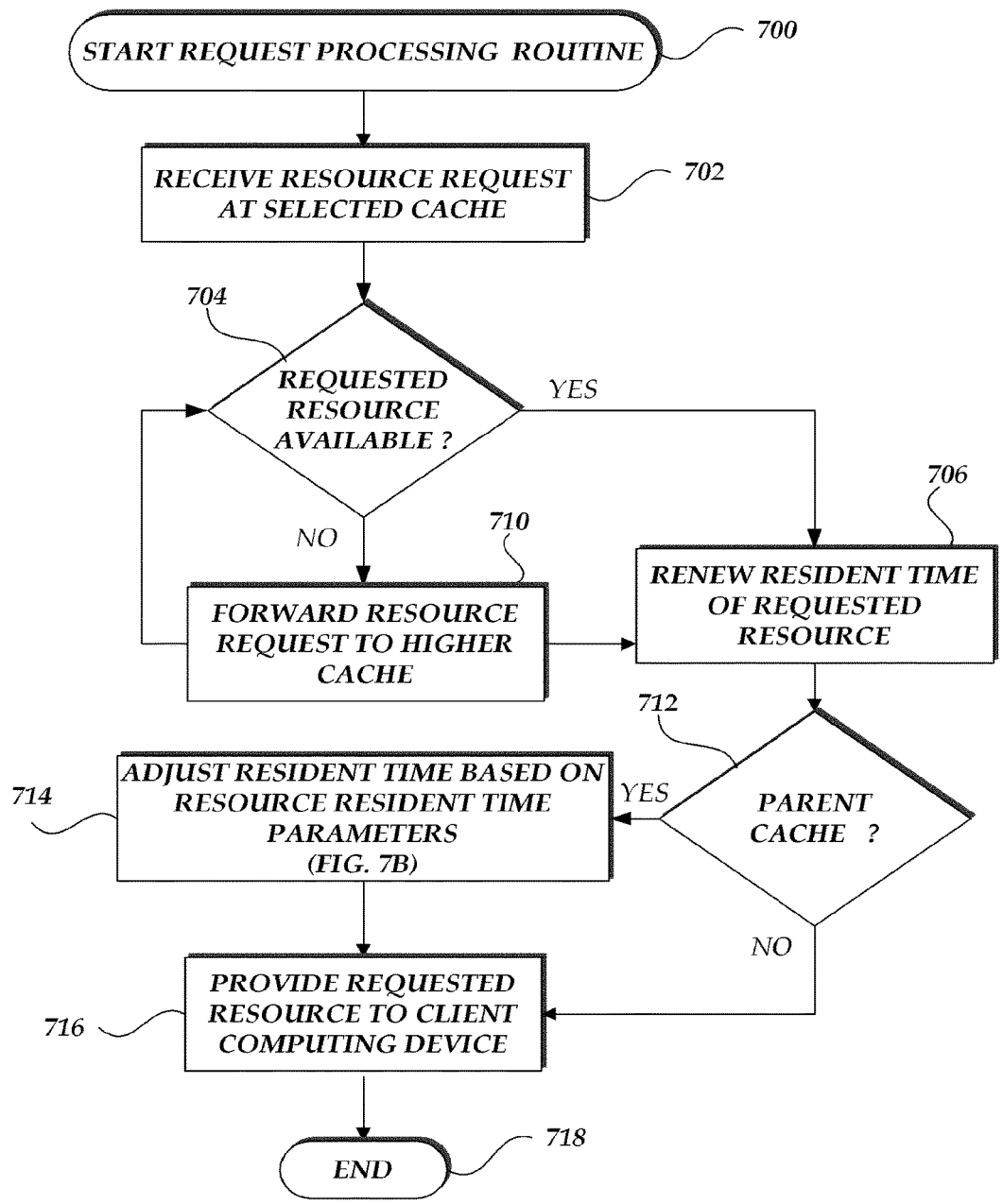
FIG. 7A is a flow diagram illustrating one embodiment of a request processing routine implemented by an embodiment of the hierarchy of cache server components of FIG. 6.

With reference now to FIG. 7A, a request processing routine 700 implemented by a resource cache component to process resource requests will be described. At block 702, a resource request is received at the resource cache component. As previously discussed, the resource request may be transmitted from a client computing device and the requested resource may correspond to an embedded resource in content requested by a client computing device 102 and previously provided by the content provider 104.

At decision block 704, a test is conducted to determine whether the current resource cache component has stored the requested resource. If the current resource cache component maintains the requested resource in storage, the current resource cache component renews the expiration data, such as resident time, at block 706. If, however, at decision block 704, the current resource cache component does not maintain the requested resource in storage, the current resource cache component selects another resource cache component to which a request for the resource is transmitted in block 710. As discussed above, this other resource cache component may include one or more parent resource cache components in communication with the current resource cache component. The test of decision block 704 and the request forwarding operation of block 710 may be repeated, as necessary, with parent resource cache components higher up the resource cache component hierarchy 600 until a resource cache component that maintains the requested resource in storage is identified. The routine 700 then moves to block 706, where the time to live of the requested resource on the identified parent resource cache component is renewed.

The routine 700 subsequently moves to decision block 712, where a test is performed to determine whether the resource computing device that is identified to maintain the requested resource in storage is the resource cache component that originally received the request from the client computing device 102 or a parent resource cache component. In one embodiment, such a determination may be made by review of the resource request. When the original resource cache component forwards a resource request to a parent resource cache component, a record may be stored in the resource request to this effect, allowing the parent resource cache to identify that it is not the original recipient of the resource request.

If the resource computing device that is identified to maintain the requested resource in storage is the resource cache component that is the current resource cache component (e.g., the resource cache component that originally received the request from the client computing device 102), the routine moves to block 716, where the requested resource is transmitted to the client computing device by the current resource cache component.

If, however, the resource computing device that is identified to maintain the requested resource in storage is a parent resource cache component to the current resource cache component, the routine 700 proceeds to block 714. At block 714, the current resource cache component determines whether to adjust the resident time associated with the requested resource. Illustratively, the adjustment is based on the various resource processing parameters and can include increasing the resident time, decreasing the resident time or not adjusting the resident time. An illustrative sub-routine 750 for determining whether to adjust resident time will be described with regard to FIG. 7B (below). The routine moves to block 716, where the requested resource is transmitted to the client computing device by the current resource cache component.

Figure 7B:
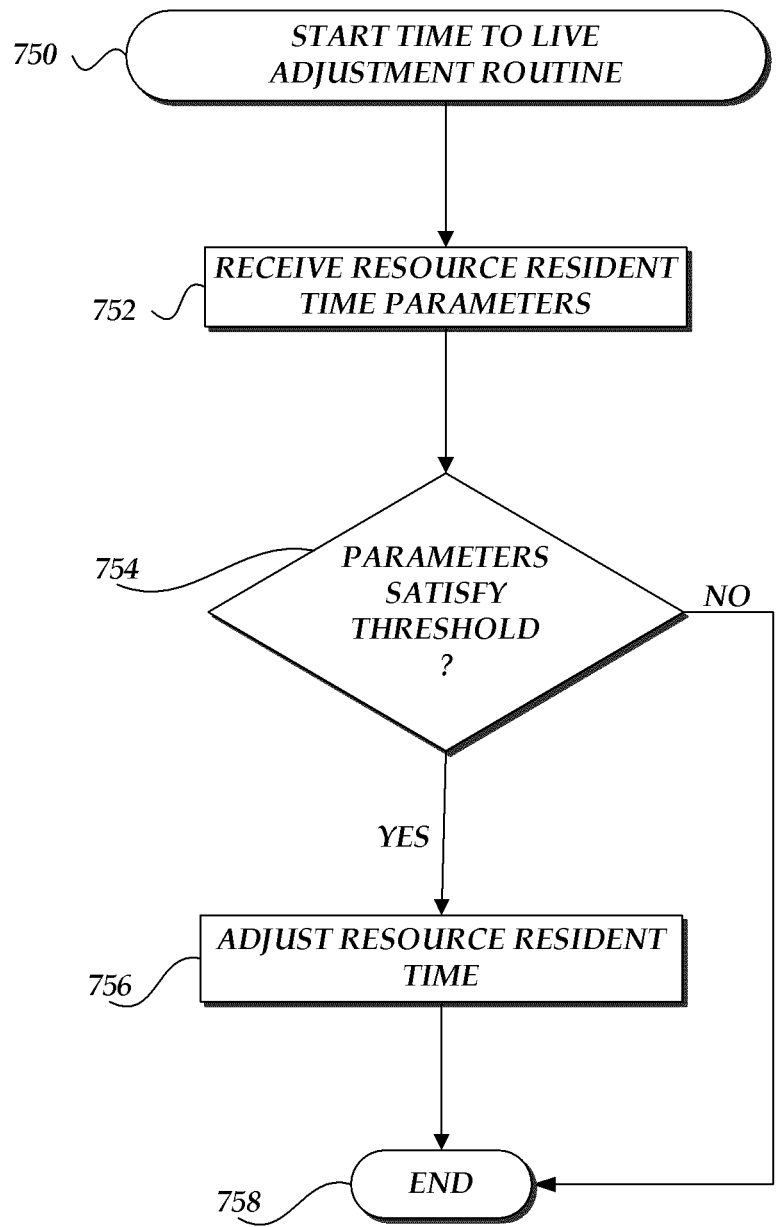
FIG. 7B is a flow diagram illustrating one embodiment of a routine for adjusting resident time assigned to a resource stored by an embodiment of the hierarchy of cache server components of FIG. 6.

With reference now to FIG. 7B, an embodiment of a resident time adjustment routine 750 implemented by a resource cache component will be described. As described above, the routine 750 can be used by a resource cache component to determine whether to adjust a resident time associated with a resource requested by another resource cache component (e.g., the transmitting resource cache component) within a resource cache component hierarchy. At block 752, the resource cache component obtains resource resident time parameters associated with the resource request. As previously described, the resource request parameters correspond to information associated with the specific resource request from the transmitting resource request component. In one embodiment, the resource request parameters can include a number of requests transmitted by the transmitting resource cache component over a fixed period of time. In another embodiment, the resource request parameters can include a time elapsed since a milestone, such as the time since the last request for the resource or a time since the expiration of the resource. In still further embodiments, the resource request parameters can include information associated with average resident times or default resident times associated with the transmitting resource cache component.

In decision block 756, the resource cache component determines whether the resource resident time parameters satisfy one or more threshold values. If the one or more resource resident time parameter are satisfied, the resource cache component adjusts the resident time for the requested resource at block 756. Alternatively, if the resource resident time parameters are not satisfied, the routine 750 terminates at block 758.

Illustratively, the satisfaction of the one or more threshold values for the resource resident time parameters can correspond to adjustments to increase and decrease the resident time associated with a resource. For example, if the number of requests received within a given time period increases, the resident time of the resource can be increased to indicate a lower popularity resource because the current resident time expires before the subsequent request. Likewise if a threshold amount of time has expired since the last request for the resource, the resource cache component may reset the resident time to a default value or initial value. Still further, in another example, the resource cache component can be limited in the amount of adjustment for the resident time. For example, each level of the resource cache component hierarchy may be associated with a range of resident times that limits the amount of adjustment for the resident times of resource maintained at the specific level in the resource cache server hierarchy.

While illustrative embodiments have been disclosed and discussed, one skilled in the relevant art will appreciate that additional or alternative embodiments may be implemented within the spirit and scope of the present invention. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached FIGURES should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer implemented method comprising:
as implemented by one or more computing devices configured with specific executable instructions,
processing, by a receiving cache server component, a request for a resource from a transmitting cache server component when a residence time of the resource has been exceeded at the transmitting cache server component; and
modifying expiration data of the resource based at least in part on both a resident time criteria and a level of the receiving cache server component in a hierarchy.

2. The computer implemented method of claim 1, wherein modifying expiration data of the resource based at least in part on both a resident time criteria and a level of the receiving cache server component in a hierarchy results in modified expiration data indicative of a popularity of the resource within the hierarchy.

3. The computer implemented method of claim 1, wherein modifying the expiration data of the resource based at least in part on both a resident time criteria and a level of the receiving cache server component in the hierarchy includes modifying the expiration data such that the expiration data stays within a range of values.

4. The computer implemented method of claim 1, wherein the resident time criteria corresponds to a total number of requests received from the transmitting cache server component over an established period of time.

5. The computer implemented method of claim 1, wherein the resident time criteria corresponds to a time elapsed since a previous transmittal of a request for the resource from the transmitting cache server component.

6. The computer implemented method of claim 1, wherein the transmitting cache server component corresponds to a lowest level of the hierarchy.

7. The computer implemented method of claim 6, wherein the expiration data remains fixed.

8. The computer implemented method of claim 1, wherein modifying expiration data of the resource based at least in part on both a resident time criteria and a level of the cache server component in the hierarchy comprises assigning shorter expiration data of the resource for cache server components at the lowest levels of the hierarchy.

9. The computer implemented method of claim 1, wherein modifying expiration data of the resource based at least in part on both a resident time criteria and a level of the cache server component in the hierarchy comprises assigning longer expiration data of the resource for cache server components at successively higher levels of the hierarchy.

10. A non-transitory, computer-readable storage medium having one or more computer-executable modules for managing resources, the one or more computer-executable modules configured to:
process, by a receiving cache server component, a request for a resource from a transmitting cache server component when a residence time of the resource has been exceeded at the transmitting cache server component; and
modify expiration data of the resource based at least in part on both a resident time criteria and a level of the receiving cache server component in a hierarchy.

11. The non-transitory, computer-readable storage medium of claim 10, wherein modifying expiration data of the resource based at least in part on both a resident time criteria and a level of the receiving cache server component in a hierarchy results in modified expiration data indicative of a popularity of the resource within the hierarchy.

12. The non-transitory, computer-readable storage medium of claim 10, wherein modifying the expiration data of the resource based at least in part on both a resident time criteria and a level of the receiving cache server component in the hierarchy includes modifying the expiration data such that the expiration data stays within a range of values.

13. The non-transitory, computer-readable storage medium of claim 10, wherein the resident time criteria corresponds to a total number of requests received from the transmitting cache server component over an established period of time.

14. The non-transitory, computer-readable storage medium of claim 10, wherein the resident time criteria corresponds to a time elapsed since a previous transmittal of a request for the resource from the transmitting cache server component.

15. The non-transitory, computer-readable storage medium of claim 10, wherein the transmitting cache server component corresponds to a lowest level of the hierarchy.

16. The non-transitory, computer-readable storage medium of claim 15, wherein the expiration data remains fixed.

17. The non-transitory, computer-readable storage medium of claim 10, wherein modifying expiration data of the resource based at least in part on both a resident time criteria and a level of the receiving cache server component in the hierarchy comprises assigning shorter expiration data of the resource for cache server components at the lowest levels of the hierarchy.

18. The non-transitory, computer-readable storage medium of claim 10, wherein modifying expiration data of the resource based at least in part on both a resident time criteria and a level of the receiving cache server component in the hierarchy comprises assigning longer expiration data of the resource for cache server components at successively higher levels of the hierarchy.

19. A computer implemented storage system comprising:
one or more computing devices associated with a memory and operative to:
process, by a receiving cache server component, a request for a resource from a transmitting cache server component when a residence time of the resource has been exceeded at the transmitting cache server component; and
modify expiration data of the resource based at least in part on a resident time criteria and further based on a level of the receiving cache server component in a hierarchy.

20. The computer implemented storage system of claim 19, wherein the resident time criteria corresponds to a total number of requests received from the transmitting cache server component over an established period of time.

21. The computer implemented storage system of claim 19, wherein the resident time criteria corresponds to a time elapsed since a previous transmittal of a request for the resource from the transmitting cache server component.

22. The computer implemented storage system of claim 19, wherein the transmitting cache server component corresponds to a lowest level of the hierarchy and wherein the expiration data remains fixed.

23. The computer implemented storage system of claim 19, wherein modifying expiration data of the resource based at least in part on a resident time criteria and further based on a level of the receiving cache server component in the hierarchy comprises assigning shorter expiration data of the resource for cache server components at the lowest levels of the hierarchy.

24. The computer implemented storage system of claim 19, wherein modifying expiration data of the resource based at least in part on a resident time criteria and further based on a level of the receiving cache server component in the hierarchy comprises assigning longer expiration data of the resource for cache server components at successively higher levels of the hierarchy.

* * * * *